Sept. 2, 1930.  H. F. VICKERS  1,774,685
CONTROL VALVE
Filed Feb. 25, 1929
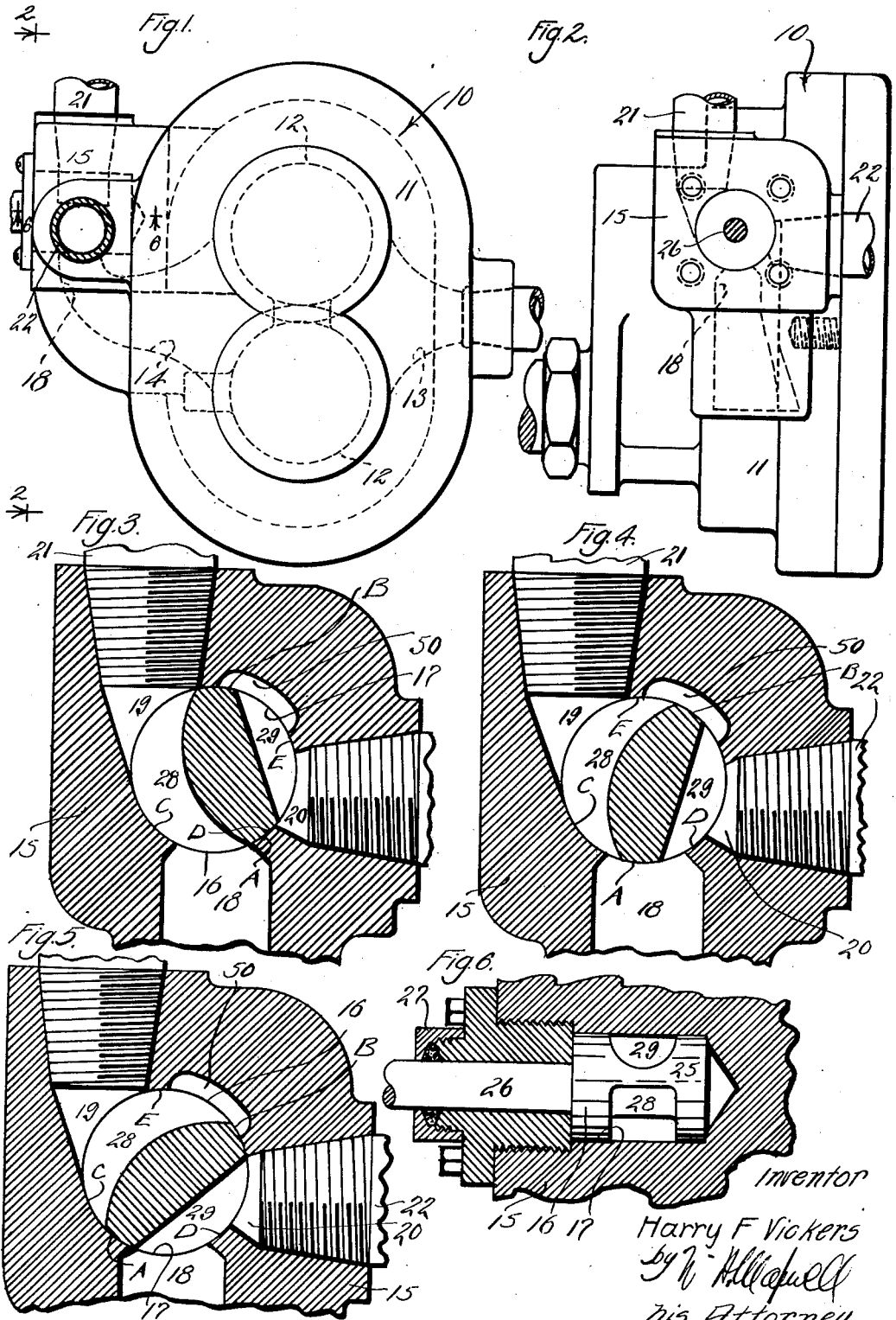
Inventor
Harry F Vickers
by [signature]
his Attorney Patented Sept. 2, 1930

1,774,685

UNITED STATES PATENT OFFICE

HARRY F. VICKERS, OF LOS ANGELES, CALIFORNIA

CONTROL VALVE

Application filed February 25, 1929. Serial No. 342,605.

This invention has to do with a fluid control and provides a device in the nature of a valve suitable for use in various situations for the control of fluid.

The control device provided by my invention is useful, generally, where it is desired to control or distribute fluid with reference to two points or applications. For instance, the invention may be used in connection with rams, motors, and various such pressure actuated devices to control the flow of fluid from a source of supply or pressure to direct it to the pressure actuated device, to a reservoir, or the like, or, in part, to both the pressure actuated device and reservoir. In the case of various pressure actuated devices, the pressure generating means operates constantly to deliver a constant supply of fluid, while it is desired to only intermittently supply such fluid under pressure to the pressure actuated device. In such case it is necessary to have control means by which part or all of the fluid circulated by the pressure generating means may be diverted from the pressure actuated device to a reservoir, or the like. In describing the present invention I will refer to a situation such as I have just mentioned, it being understood that the device of the present invention may find use in various other situations.

It is a primary object of the invention to provide a control device such as I have referred to which is of a general type known to be simple, dependable and practical.

An object of the invention is to provide a rotary type of valve device of simple, inexpensive construction and such as to obtain the action referred to without tending to cut out or leak.

It is another object of the invention to provide a control or valve, such as I referred to, in which the parts are designed and proportioned so that they are normally maintained tight, or in sealing engagement, by the pressure of the fluid being handled. The invention does not depend upon a tapered fit between the relatively moving parts to hold pressure.

The various objects and features of the invention will be best and more fully understood from the following detailed description of a typical form and application of the invention, throughout which description reference is had to the accompanying drawings, in which:

Fig. 1 is a side elevation of a pressure generating unit or pump in combination with which is a control embodying the present invention. Fig. 2 is an end elevation of the parts shown in Fig. 1 being a view taken as indicated by line 2—2 on Fig. 1. Fig. 3 is an enlarged detailed sectional view through the control device showing it in position so that the fluid under pressure is circulated to the outlet which may be in communication with the device to be actuated by the pressure. Fig. 4 is a view similar to Fig. 3 showing the valve in position where part of the fluid is diverted from the flow just mentioned, and is admitted to a by-pass or return conduit such as may extend to a reservoir, or the like, Fig. 5 is a view similar to Figs. 3 and 4 showing the valve in position where all of the fluid is diverted through the by-pass or return outlet. Fig. 6 is an enlarged view taken on line 6—6 on Fig. 1.

The device or control provided by this invention may be used in various situations, it being preferred ordinarily to use it in a situation where there is a pressure generating means or pump 10, a device or unit to be operated by fluid pressure generated by the pump, and a by-pass or return system through which the fluid may be completely or partially diverted. The by-pass or return system referred to may operate to discard the fluid. It may include a reservoir, or it may be so constructed as to allow the by-passed fluid to recirculate or return to the pump 10. In the drawings I have illustrated, generally, the pressure generating means or pump 10 but I have eliminated any showing of the device to be operated by the fluid pressure or any details of the by-pass or return system, such parts being in no way essential to the present invention.

The pump 10 illustrated in the drawings is of the gear type and includes a housing 11 carrying a pair of meshing gears 12. The housing is provided with an inlet port 13, through which a suitable fluid may be admitted to the pump to be circulated or forced by the gears, and is provided with an outlet port 14 through which fluid handled by the gears may be discharged from the pump.

The control or valve provided by the present invention comprises, generally, a body 15, and a core, or valve proper 16, operable in the body. The body of the valve carries the valve part 16 and is provided with various ports as will be hereinafter described. The body may be an independent or unitary part or it may be formed with or as a part of a construction such as the pump 10. In the drawings I have illustrated the body 15 of the valve formed on or as a part of the housing 11.

The body 15 forms a cylinder or carrier for the valve proper. In the construction illustrated the body has a cylindrical opening 17 formed in it to receive the valve proper. In accordance with the present invention, three main ports are formed laterally in the body to communicate with the cylindrical opening 17 intermediate its ends. One of the ports, 18, is a supply port through which fluid is introduced to the valve from the pump 10, another port 19 is a delivery or outlet port through which fluid may discharge to any desired point, say for instance to a device where it may perform useful work, and the third port 20 is a discharge or exhaust port through which fluid may discharge to any desired point, say for instance to a reservoir or to a return connection whereby it is returned to the pump 10. The supply port 18 in the case illustrated is in direct communication with the port 14 of the pump, in fact may be a continuation of the port 14, as shown in the drawings. The port 19, which I will refer to as the outlet port, may be such as to supply the fluid to the desired point or to a conduit for conducting it to the desired point. In the case illustrated I have shown the port 19 such as to receive a conduit 21 by which the fluid may be conducted to the point where it is to be used. The port 20, which I will term the exhaust port, is shown provided to receive a conduit 22 which may conduct the fluid passed to the port 20 to a reservoir, back to the pump 10, or in any desired manner.

The invention further provides a by-pass port 50 in the wall E of the opening 17 between the ports 19 and 20 to function as hereinafter described.

The valve proper, 16, comprises a head 25 round in cross section and fitted in the opening 17 of the body, and a stem 26 extending from one end of the head to project from the body 15. The head of the valve is round in cross section to correspond to the opening 17 of the body and in practice is made to fit or seat closely in the opening 17. The stem 26 of the valve projects from the open end of the opening 17 to form an operating stem to which a handle or suitable tool may be applied. In the preferred construction a suitable packing means 27 is provided at the open end of the opening 17 to pack between the body 15 and the stem 26 of the valve.

In accordance with this invention, the head 25 of the valve is recessed or cut away at one side, 28, to allow passage of fluid between ports 18 and 19 when the head is positioned as shown in Fig. 3, and is cut away at the opposite side, at 29, to allow flow of fluid between the ports 18 and 20 when the head is positioned as shown in Fig. 5. The recess, or cut away part 28, is of such extent as to remove the the wall of the head throughout about 185 degrees while the recess 29 is such as to remove the wall of the head throughout about 130 degrees. This leaves the head, at the point where it cooperates with the ports, with spaced side walls A and B each extending through about twenty-two and one-half degrees.

The supply port 18 extends around the wall of the opening 17 throughout about 60 degrees; the outlet port 19 extends around the wall of the opening 17 throughout about 90 degrees, and the wall C of the opening 17 between the ports 18 and 19 extends throughout about 35 degrees. Thus the circumferential extent of the ports 18 and 19 and the wall of the opening between the ports 18 and 19 together corresponds approximately to the extent of the recess 28 around the head 25 of the valve. It will thus be obvious that the head of the valve may be positioned as shown in Fig. 3 so that the recess 28 uncovers both the ports 18 and 19 and the wall C between these ports allowing free passage or communication of fluid between the ports 18 and 19. When in this position, the pressure of the fluid on the valve seats the valve tightly against the walls of the opening between port 20 and port 19 and between port 20 and port 18 thus tightly sealing port 20.

The exhaust port 20 extends around the wall of the opening 17 throughout about 45 degrees and is spaced from the port 18 about twenty-two and one-half degrees. The proportioning of the parts just described leaves the opening 17 with a wall portion E of about 105 degrees of extent between the ports 19 and 20. The by-pass port 50 is in the form of a recess located in the middle of the wall E and extending through about 60 degrees. The recess 29 in removing the wall of the head throughout about one hundred and twenty-seven and one-half degrees and the walls A and B of the head between the recesses being of about twenty-two and one-half degrees in extent, allows the head to be positioned so that the wall A is at about the middle of the port 18 while the wall B is at about the middle of the port 50, allowing fluid from the port 18 or from port 19, or both, to pass either or both side walls A and B of the valve to enter the exhaust port 20.

With the head in this position, the recess 28 will still have free communication with the port 19 and will have free communication with the port 20. With the ports in this position, the fluid may be discharged from port 19 to the exhaust port around either or both side walls A and B of the valve 16. Further, it will be apparent that this positioning of the head 25 may allow a portion of the fluid to be by-passed through the port 20 so that it does not circulate or discharge through the outlet port 19.

When the head 25 is positioned as shown in Fig. 5, the wall A of the head engages the wall C of the opening between ports 18 and 17, while the wall B of the head engages the wall E of the opening between ports 19 and 20. Under such condition the port 18 communicates with the recess 29 but not with the recess 28. The recess 29 establishes communication between the ports 18 and 20, the port 19 being completely cut off from the port 18. It will be apparent that the valve head is such that the pressure of the fluid admitted through the port 18 tends to seat the walls A and B of the head on the walls C and E of the opening to prevent leakage to the by-pass port when the valve is set to supply full pressure to the outlet port.

Having described only a typical, preferred form of my invention, I do not wish to limit myself to the specific details set forth, but wish to reserve to myself any changes or variations that may appear to those skilled in the art or fall within the scope of the following claims.

Having described my invention, I claim:

1. A device of the character described including, a body having a cylindrical opening, and a valve rotatably carried in the opening, the body having a supply port, an outlet port and an exhaust port communicating with the opening at different points around the opening, the valve having recesses in opposite sides to cooperate with the ports and side walls between the recesses fitting the wall of the opening, the recess cooperating with the exhaust port extending less than 180 degrees around the valve, one of the side walls of the valve being of less circumferential extent than the supply port and the parts being related so that the supply port has communication with the outlet port and with the exhaust port when said side wall is at the supply port, there being a recess in the wall of the opening forming a by-pass around the other side wall of the valve when the parts are in said position.

2. A device of the character described including, a body having a cylindrical opening, and a valve rotatably carried in the opening, the body having a supply port, an outlet port and an exhaust port communicating with the opening at different points around the opening, the valve having recesses in opposite sides to cooperate with the ports and side walls between the recesses fitting the wall of the opening, the recess cooperating with the exhaust port extending less than 180 degrees around the valve, one of the side walls of the valve being of less circumferential extent than the supply port and the parts being related so that the supply port has communication with the outlet port and with the exhaust port when said side wall is at the supply port, there being a recess in the wall of the opening between the outlet port and the exhaust port forming a by-pass around the other side wall of the valve when the parts are in said position.

3. A device of the character described including, a body having a cylindrical opening, and a valve rotatably carried in the opening, the body having a supply port extending substantially 60 degrees around the opening, an exhaust port spaced substantially 22 degrees from the supply port and extending substantially 45 degrees around the opening and an outlet port spaced substantially 105 degrees from the exhaust port, the valve having a recess in one side extending substantially 127 degrees around the valve and a recess at the opposite side extending substantially 185 degrees around the valve.

4. A device of the character described including, a body having a cylindrical opening, and a valve rotatably carried in the opening, the body having a supply port extending substantially 60 degrees around the opening, an exhaust port spaced substantially 22 degrees from the supply port and extending substantially 45 degrees around the opening and an outlet port spaced substantially 105 degrees from the exhaust port, the valve having a recess in one side extending substantially 127 degrees around the valve and a recess at the opposite side extending substantially 185 degrees around the valve, there being a recess in the wall of the opening between the exhaust port and the outlet port.

5. A device of the character described including, a body having a cylindrical opening, and a valve rotatably carried in the opening, the body having a supply port extending substantially 60 degrees around the opening, an exhaust port spaced substantially 22 degrees from the supply port and extending substantially 45 degrees around the opening and an outlet port spaced substantially 105 degrees from the exhaust port, the valve having a recess in one side extending substantially 127 degrees around the valve and a recess at the opposite side extending substantially 185 degrees around the valve, there being a recess in the wall of the opening between the exhaust port and the outlet port and extending substantially 60 degrees around the opening.

In witness that I claim the foregoing I have hereunto subscribed my name this 7th day of November, 1928.

HARRY F. VICKERS.